United States Patent [19]

Sigety, Jr.

[11] 4,418,440
[45] Dec. 6, 1983

[54] WINDSHIELD WIPER APPARATUS

[75] Inventor: Stephen Sigety, Jr., Mt. Clemens, Mich.

[73] Assignee: General Motors Corporation, Detroit, Mich.

[21] Appl. No.: 395,145

[22] Filed: Jul. 6, 1982

[51] Int. Cl.³ .......................... B60S 1/18; B60S 1/36
[52] U.S. Cl. ............................... 15/250.21; 15/250.24
[58] Field of Search ........... 15/250.21, 250.23, 250.13, 15/250.29, 250.24, 250.25

[56] References Cited

U.S. PATENT DOCUMENTS 1,660,971 2/1928 Linder .............................. 15/250.21
2,629,891 3/1953 Greene ............................. 15/250.21
3,729,766 5/1973 Buchanan, Jr. .................. 15/250.21
3,831,220 8/1974 Gmeiner et al. ................. 15/250.21

FOREIGN PATENT DOCUMENTS 1162324 4/1958 France ............................. 15/250.21

Primary Examiner—Peter Feldman
Attorney, Agent, or Firm—Dean L. Ellis

[57] ABSTRACT

A vehicle window wiping apparatus includes a guide arm and a wiper arm telescopable to simultaneously extend or retract the wiper arm on the guide arm as the wiper arm is driven by an endless belt drive means which carries an end of the wiper arm in a noncentric path with relation to the rotary axis of oscillation of the guide arm.

3 Claims, 5 Drawing Figures

U.S. Patent      Dec. 6, 1983      4,418,440
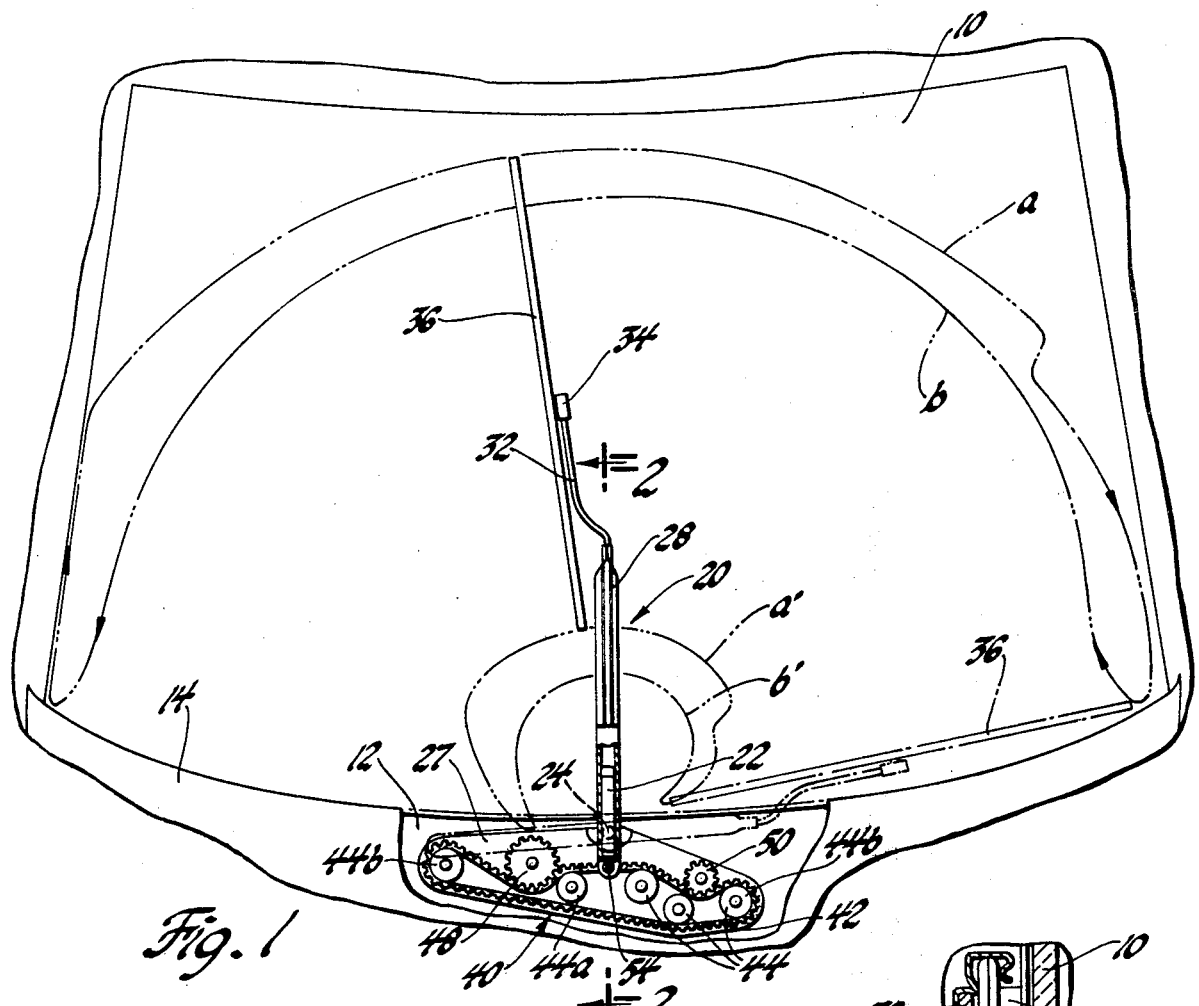
Fig. 1
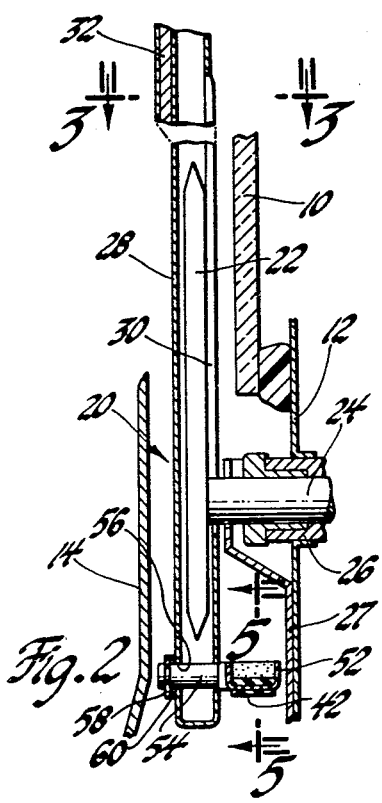
Fig. 2
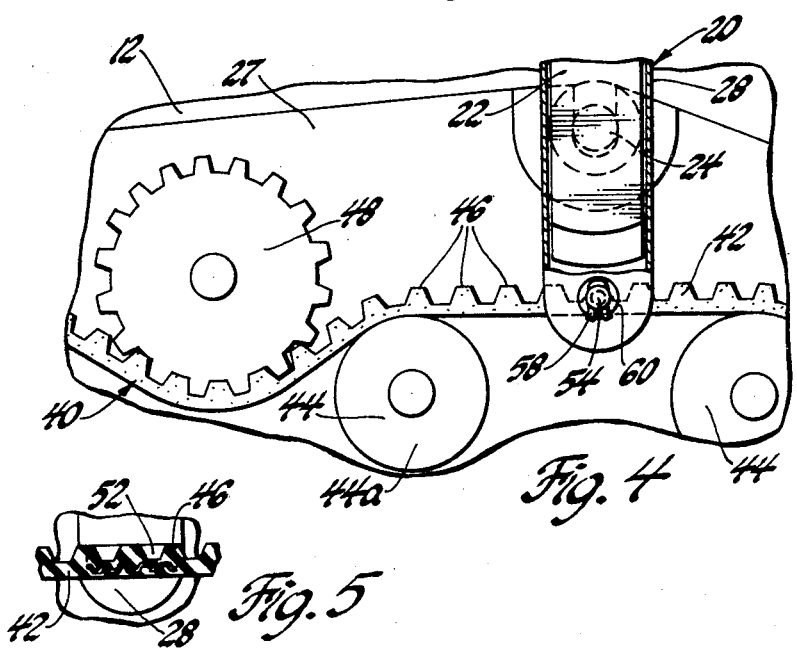
Fig. 3
Fig. 4
Fig. 5

WINDSHIELD WIPER APPARATUS

This invention relates to window cleaning apparatus and more particularly to windshield wiper apparatus for automotive vehicles or the like.

Current trends in design of automobiles of smaller size and more aerodynamic shape are creating somewhat unconventional outlines for the windshield and rear windows of the vehicle. In some designs the window approaches more the square configuration, i.e., configurations where its longitudinal centerline surface dimension is at least greater than one half the lateral dimension. Such a trend of course complicates the functioning of the typical windshield or window wiper apparatus provided in the vehicle, and compounds the demand for more efficient and lightweight wiper apparatus as a general matter. As aspect of these trends is the frequent suggestion to eliminate the usual coordinated double wiper blade apparatus in favor of a single wiper blade apparatus capable of cleaning substantially the same viewing area.

The present invention provides windshield wiping apparatus aimed at achieving the above noted objectives. In an illustrative embodiment, it comprises a single wiper blade designed to sweep an enhanced viewing area. Whether it be a single wiper blade version or one utilized with multiple blades, it features apparatus having a guide arm mounted to rotate on an axis adjacent an edge of the windshield and carrying a wiper arm adapted to translate relative the guide arm so as to enhance the swept area of the wiper blade over the windshield. The swept area of the blade is very simply but effectively controlled by an endless belt drive means attached to the translatable wiper arm and arrayed over a path so designed to carry the wiper arm and the guide arm as a unit in an oscillatory motion on the windshield and simultaneously extend and retract the wiper arm on the guide arm in a manner controlled to provide the predetermined enhanced swept area. The use of an endless belt in the manner set forth provides flexibility of design for achieving any number of unusual wiping patterns or enhancements of swept area simply by appropriate design of the path to be travelled by the endless belt. This path is readily created by an appropriate array of rollers arranged in a predetermined placement selected with reference to the rotary axis of the guide arm.

Other efficiencies and features will be readily seen as accomplished with the use of a belt driven continuously in one direction and returned in a path over the rollers in such manner that continuous belt motion provides an oscillatory motion to the guide arm and wiper arm while providing the translating motion of the wiper arm on the guide arm. Reductions in complexity and cost are realized in the use with an electric or other single direction motor of a sprocket or toothed drive gear cooperating with cog teeth on the drive belt and simple direct connection of one end of the wiper arm with the belt. These and other features and advantages of the invention will be readily apparent from the following specification and from the drawings wherein:

FIG. 1 is a fragmentary perspective view of an automotive vehicle body including a windshield and windshield wiping apparatus therefor in accordance with the invention;

FIG. 2 is an enlarged sectional view taken generally along the plane indicated by lines 2—2 of FIG. 1;

FIG. 3 is a sectional view taken generally along the plane indicated by lines 3—3 of FIG. 2;

FIG. 4 is an enlarged view of a portion of FIG. 1; and

FIG. 5 is a sectional view taken generally along the plane indicated by lines 5—5 of FIG. 2.

Referring now to FIG. 1 of the drawings, the same shows a vehicle body including a windshield 10 bounded at its lower margin by a windshield cowl 12 and partially overlapped by the rear margin of a hood panel 14. It will be understood, however, for the purposes of the invention that it is applicable to rear backlites or similar vehicle windows. In the illustrative embodiment the windshield is shaped in accordance with design trends in which aerodynamic body side profile treatments and interior seating space dictate a shape for the windshield which tends substantially more toward the square, i.e., a shape where the longitudinal center line surface dimension of the glass is greater than at least one half the lateral dimension. In the presently disclosed embodiment, the unconventional demands thereby placed on the windshield wiping apparatus are answered by a single wiper assembly structured in accordance with the principles of the invention. It will, however, be recognized that, as the description proceeds, these principles lend themselves toward multiple wiper blade apparatus and indeed to various other shapes of windshields where other unconventional wiping patterns may be required.

The wiper apparatus is designated generally 20 and includes a guide arm 22 mounted adjacent one end thereof on a shaft 24 journalled in a bearing 26 affixed on the cowl structure 12 of the vehicle body immediately below the lower edge of windhshield 10 and located generally on the longitudinal center line of the windshield. The shaft 24 is further received in a slot of a backing plate 27 of the wiper apparatus 20 which is suitably affixed as by fasteners to the cowl structure 12. A windshield wiper arm 28 is slidably received upon guide arm 22 and as seen in greater detail in FIG. 2, the wiper arm is tubular and slotted adjacent its lower end at 30 to permit telescoping or reciprocating movement of the wiper arm upon the guide arm 22, the slot 30 of course receiving the shaft 24 of the guide arm. Adjacent its upper end, the wiper arm 28 is stamped to have a channel section which receives a rod-like extension 32 affixed thereto in well known manner and bent along its length also in well known manner appropriate to the seating of the wiper blade upon the surface of windshield 10. As further well known in the art, the extension 32 carries at its end a wiper blade mounting device 34 receiving by snap fit or otherwise a conventional molded elastomer windshield wiping blade 36.

As seen in FIG. 1, the wiper blade 36 is of a length designed to match a great portion of the longitudinal center line dimension of the particular windshield 10, thus to sweep the necessary large view area of such windshield about the axis of shaft 24. However, if the wiper blade is oscillated toward an end position lying generally horizontally and adjacent the lateral edge of the windshield in order to clean the lower desired view area of the glass including the lower corners, then this simple rotary oscillation of the blade about the axis of shaft 24 would carry the blade off of the surface of the windshield because of the shape of the latter.

In accordance with the principles of the invention the wiper arm 28 is actuated by an endless belt drive means designed to provide the enhancement of the sweeping area of the wiper blade 36 over the windshield, in this case by alteration of its path of travel as it approaches either of the oscillated horizontal end positions adjacent the lateral lower corners of the windshield. The endless belt drive means is designated generally as 40 and includes a flexible belt 42 of molded fabric reinforced elastomer or the like and arrayed over a series of rollers 44 mounted on the backing plate 26. The placement of the rollers is especially selected for this windshield shape at locations spaced laterally either side of the longitudinal center line plane of the windshield. Thus, in this particularized embodiment of the invention, the belt 42 is adapted to travel a path which is exaggeratedly noncentric to the axis of the rotary mounting of guide arm 22 on shaft 24, such path of the belt aaproximating generally straight upper and lower courses over the rollers 44.

The belt 42 is molded with an exterior series of teeth 46 suitable for meshing engagement with a drive sprocket 48. An idler sprocket 50 is located at the other side of the array of rollers 44 to provide tensioning.

Wiper arm 28 carries at its lower end suitable mounting provisions for direct connection with the belt 42, the instant embodiment having as a preferred expedient at some discreet location of the belt of a sinuous stamped metal pin retainer 52 molded in situ within the belt. Such retainer 52 carries a pin 54 projecting laterally of the belt for reception within a bore 56 at the remote distal end of the wiper arm 28 below the shaft 24. A horeshoe clip 58 is received within a groove of the pin 54 over a washer 60 to retain the pin within the wiper arm.

Suitable power source for the drive sprocket 48 of the wiper apparatus 20 is not shown in detail in the drawings but may of course involve a fractional horsepower d.c. electric motor selectively driven continuously in one direction and attached or connected with the sprocket 48 in simple manner through simple speed reduction gear means. Electronic controls can of course be provided and adapted to the conventional functions of parking of the wiper blade when shut off, proper phasing with windshield washer equipment, and the like. All of these functions are well known in the art and will not be described in detail.

To describe now the operation, it is seen in FIG. 1 that the wiper blade is shown in a solid line position in more or less centered condition adjacent the windshield longitudinal center line wherein the wiper blade defines a large height dimension for sweeping of the viewing area of the glass indicated by the upper and lower broken lines at the terminal ends of the blade. In this position the connecting pin 54 at the lower distal end of the wiper arm is located substantially centrally in the array of rollers 44 of the path of the belt 42 and immediately below shaft 24. As the belt 42 is driven leftwardly by drive sprocket 48 from this position, pin 54 is carried noncentrically of shaft 24 over a path causing the wiper arm 28 to retract away from shaft 24 relative the guide arm 22 while simultaneously the wiper arm and the guide arm are caused to oscillate as a unit from the position shown in solid lines toward one end position shown lying substantially horizontal in broken lines in FIG. 1. This retraction of the wiper arm on guide arm 22 causes the wiper blade 36 to describe the enhanced path indicated by the broken lines at the tips of the blade as shown in FIG. 1. Thus, as the pin 54 passes leftwardly of middle roller 44a, a wiper blade is retracted on the guide arm 22 and continues to retract as the pin 54 approaches leftmost roller 44b, whereat the blade reaches its limit of retraction at the end position of the blade as shown. The enhanced path of the blade tips during this course is indicated at a and a' in FIG. 1. The pin 54 then follows a circumscribing path with belt 42 around the periphery of the leftmost roller 44b to commence a new path of enhanced translatory movement of the wiper blade over an inner path designated as b and b' in FIG. 1. By appropriate placement of the various rollers 44 these two oscillatory paths of tip movement a and b may be made very nearly coincident, as shown. Continued movement of the belt 42 by the drive sprocket 48 carries the pin 54 rightwardly past leftmost roller 44b whereupon the wiper arm is then caused to extend on guide arm 22 until the pin 54 underlies shaft 24. Continued belt movement toward the rightmost roller 44b causes the wiper blade to again retract and inner blade tip path b scribes an enhanced wiping area as the blade approaches the leftward end position of the blade, not shown. As the pin 54 and belt scribe the path around the rightmost roller 44b when the wiper blade reaches its oscillatory leftward end position, a repeating sequence occurs and the wiper blade is caused to commence again by extending movement of the upper path a back to the originally described position as shown in solid lines.

Thus, it is seen that the instant invention provides a windshield wiper apparatus adapted to the enhancement of a wiping area of glass by a wiper blade that may be easily altered to a predetermined shape merely by appropriate selection of the path of travel of the belt 42 over rollers 44. The selected array of the latter is of course done with relation to the axes of shaft 24. While in the instant embodiment the enhancement of the wiping area takes the form of retraction of the wiper blade as it moves toward end positions adjacent the windshield lower corners, it will of course be appreciated that with other shapes of windshields or vehicle body windows it may be desired that the belt and roller 44 array around shaft 24 cause the wiper blade to extend or to both extend and retract for the best enhancing of the swept area. Even further modifications of these apparent alternative arrangements will be understood by those skilled in the art.

The embodiments of the invention in which an exclusive property or privilege is claimed are defined as follows:

1. Vehicle windshield wiper apparatus comprising, a guide arm, means rotatably mounting the guide arm adjacent one end thereof on an axis of the vehicle, a wiper arm mounted on the guide arm for translation relative thereto and unitary rotation therewith about said axis, wiper means on the wiper arm adapted to clean the vehicle windshield, and endless belt drive means connected to the wiper arm adjacent one end thereof to move such end along a predetermined path noncentric with said axis whereby the guide arm and wiper arm are oscillated as a unit about said axis and the wiper arm simultaneously translated relative the guide arm to provide a corresponding predetermined area of cleaning of the windshield by the wiper means.

2. In a vehicle body having a windshield therein, windshield wiper apparatus comprising, a guide arm, means adjacent one edge of the windshield rotatably mounting one end of the guide arm on an axis of the vehicle, a wiper arm adapted to traverse the windshield about said axis and having a distal end portion projecting beyond said axis remote from said windshield edge, means mounting the wiper arm reciprocably on the guide arm for translation relative thereto and unitary rotation therewith about said axis, wiper means on the wiper arm adapted to clean the vehicle windshield, an endless drive belt laid on the vehicle body over a path formed with predetermined noncentric relation to said axis, means connecting said belt and said wiper arm distal end portion, and means driving the belt along said path whereby the guide arm and wiper arm are oscillated as a unit about said axis and the wiper arm simultaneously translated relative the guide arm to provide a predetermined area of cleaning of the windshield by the wiper means.

3. In a vehicle body having a windshield therein, windshield wiper apparatus comprising, a guide arm, means adjacent one edge of the windshield rotatably mounting one end of the guide arm on an axis of the vehicle, a wiper arm adapted to traverse the vehicle about said axis and having a distal end portion projecting beyond said axis remote from said windshield edge, means mounting the wiper arm reciprocably on the guide arm for translation relative thereto and unitary rotation therewith about said axis between end portions, wiper means on the wiper arm adapted to clean the windshield, an endless drive belt trained over a series of rollers arrayed on the vehicle body laterally either side of said axis, means connecting said belt and said wiper arm distal end, drive means for moving the belt over the rollers in one direction continuously, said rollers being arrayed relative said axis such that said movement of the belt oscillates the guide arm and the wiper arm as a unit about said axis and simultaneously translates the wiper arm on the guide arm to move the wiper means toward said axis as the guide arm and wiper arm unit approach either oscillatory end position thereof.

* * * * *